United States Patent Office 3,282,606
Patented Nov. 1, 1966

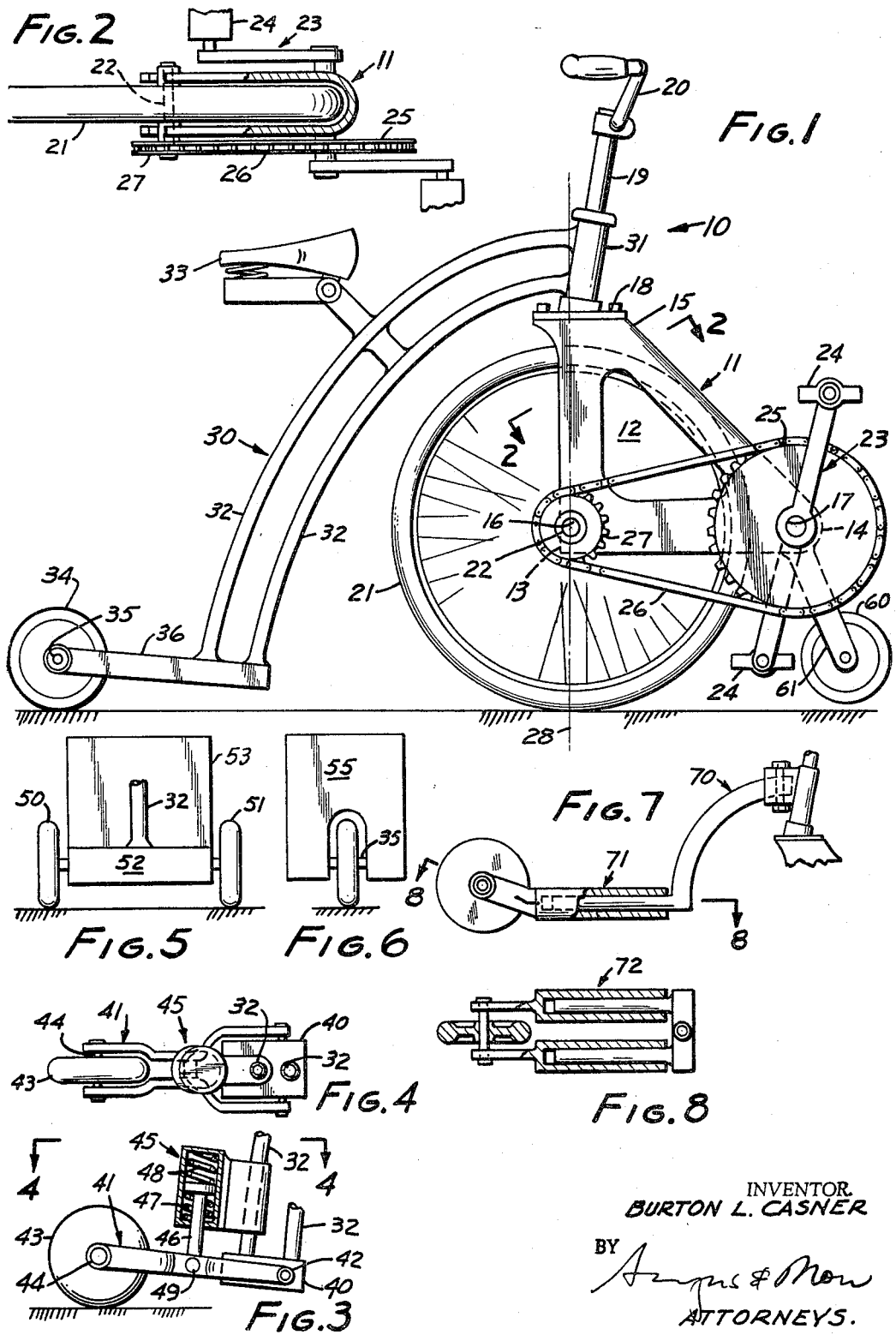

3,282,606
OPERATOR-PROPELLED CYCLE
Burton L. Casner, Box 817, Perris, Calif.
Filed Sept. 20, 1965, Ser. No. 488,368
12 Claims. (Cl. 280—239)

This invention relates to a cycle.

Conventional bicycles and tricycles have long been taken for granted, and little thought has been given to redesigning them because of the general acceptance of the conventional types. However, the design of the standard bicycle is basically incorrect in many respects. The riding position is uncomfortable and inefficient. Leg and back muscles are used at a disadvantage and one is limited to the weight of his body as a source for pressure on the pedals. This drastically limits hill-climbing ability. With the device of this invention, the reaction of the body with the cycle more nearly resembles rowing a boat. Arms, shoulders and back muscles are used. For ordinary level riding, this drastically reduces the effort and, for going up hills, greatly increased energy is available.

Furthermore, the design of conventional cycles limits the construction of the trailing end. This is because the drive mechanism on tricycles is directly mounted to the axle of the leading wheel and as to tricycles and bicycles of normal design, it is mounted to the trailing frame for direct drive to the rear wheels. This results in a severe limitation on design, restricting the load-carrying adaptability of the cycle as well as restricting the number of positions which can be occupied by the rider.

Still another disadvantage of the conventional cycle is the need to assemble it of many complex pieces, often requiring the use of expensive and complex jigs, fixtures and welding operations. It is an object of this invention to provide a cycle in which many parts can be eliminated altogether, and in which many other functions can be combined in a simple one-piece pressed steel frame.

A cycle according to this invention includes a principal frame which carries a main wheel journal and a crank journal. These journals are parallel to each other. A main wheel having a driving axle is journaled in the main wheel journal. A crank is journaled to the crank journal, and drive means interconnects the same for turning the main wheel. A steering post projects from the principal frame and is journaled in a steering post journal that is carried by a trailing frame. A seat is mounted to the trailing frame, and the elements are arranged so that the crank journal and the seat are on opposite sides of an upright axis which passes through the main wheel journal, the crank journal being disposed forwardly of the main wheel. A trailing wheel supports the trailing frame rearwardly of the main wheel.

According to a preferred but optional feature of the invention, the principal frame is sector-shaped, having an apex at the main wheel journal.

According to still another preferred but optional feature of the invention, the principal frame is a U-sectioned pressing.

The above and other features of this invention will be fully understood from the following detailed description and the accompanying drawings in which:

FIG. 1 is a side elevation of the presently preferred embodiment of the invention;

FIG. 2 is a cross-section taken at line 2—2 of FIG. 1;

FIG. 3 is a fragmentary side elevation of another embodiment of trailing wheel useful in the device of FIG. 1;

FIG. 4 is a top view of FIG. 3; and

FIGS. 5-8 show additional embodiments of trailing wheel structures.

In FIG. 1, there is shown a cycle 10 having a principal frame 11 which is preferably a U-sector shaped, unitary steel pressing. It may, if desired, include lightening holes 12 in the sides. It has three apexes 13, 14, 15. A main wheel journal 16 is disposed at apex 13 and forms a center of the sector. A crank journal 17 is formed at apex 14. At apex 15, there is a mounting plate 18 which serves to mount a steering post 19 which rises from the principal frame. Journals 16 and 17 are parallel to each other.

A pair of handle bars 20 is mounted to the steering post so that the principal frame can be turned. A main wheel 21 includes a driving axle 22, this axle being journaled in the main wheel journal. A crank pedal assembly 23 is journaled in the crank journal so that pedals 24 can be turned by the foot to rotate a sprocket 25 mounted to the crank pedal assembly and, through chain 26, turn a sprocket 27 that is connected to the main wheel axle. In this manner, the main wheel is turned. An upright axis 28 is shown rising vertically from the ground passing through the center of the main wheel while the bicycle stands in its upright position. The direction to the right of the axis as shown in FIG. 1 is considered the forward direction, and to the left, it is considered the rearward direction.

A trailing frame 30 is mounted to the steering post, and to the principal frame through a steering post journal 31 by the engagement of steering post 19 in journal 31. The trailing frame may assume numerous forms such as pressings and stampings, but is shown here comprising two bent steel tubes 32 which are joined to the steering post journal by means such as welds. A seat 33 is mounted to this frame. It is disposed on the opposite side of the upright axis from the crank journal, with the main wheel journal between them, and with the main crank journal forwardly of the main wheel.

A trailing wheel 34 is shown mounted to the trailing frame by an axle 35, which axle is journaled in a plate 36. Plate 36 is joined by means such as welds to tubes 32.

An alternate form of trailing wheel is shown in FIG. 3 wherein a plate 40 is mounted to the tubes 32, and a double yoke 41 is mounted by hinge pins 42 thereto. This double yoke embraces a trailing wheel 43 which is mounted thereto by an axle 44. A centering spring assembly 45 is mounted to tube 32, this assembly comprising a rod 46 which is centrally biased by springs 47, 48 to a central position, and which is hinged-jointed by pin 49 to yoke 41. It will now be seen that a springing ride will be obtained for the trailing wheel by virtue of the action of the centering spring assembly. This softens the ride.

FIG. 5 shows how a pair of trailing wheels 50, 51 can be attached by means such as a center plate 52 to tubes 32 so as to provide a tricycle construction. A load-carrying box 53 can be mounted to the center plate.

FIG. 6 shows the embodiment of FIG. 1 with the axle of the trailing wheel extended to provide a support for a box 55 which can serve as a carrier for goods and equipment. It illustrates the fact that with the principal load on the main wheel, and the operator sitting well forward of the trailing wheel, there is a considerable freedom of design for the trailing frame, which trailing frame can extend for a considerable distance back of the operator, if desired. The use of the main wheel at the front end with the feet of the operator extending forwardly where they will form no interference with the trailing portion permits an unusually wide range of designs and will form a common portion of many different types of vehicles using this propulsion.

FIG. 1 further illustrates an additional safety feature which may or may not be desired. It is a stabilizer wheel 60 mounted by a yoke 61 to the principal frame and extending forwardly thereof. When the trailing and main wheels are in contact with the ground, it is off the ground. It does, however, serve to prevent the device from pitching over forwardly, should such protection be desired.

FIGS. 7 and 8 illustrate two additional optional features of the invention. Steering post journal 31 is illustrated, and to this the principal frame can be joined as in FIG. 1. In addition, a joint 70 is shown mounted to it by means of which a trailing frame 71 can be joined to the principal frame. This joint may be of any desired type, preferably a rigid tubular joint. Then various types of trailing frames may be substituted for one another in combination with the same principal frame.

Trailing frame 71 is adjustable, instead of rigid. It includes a telescopic joint 72 by means of which the wheel base of the cycle can be variably adjusted.

An examination of FIG. 1 will indicate that the operator is in an optimum position with his arms in substantially a rowing position so that he is able to utilize his arm and back muscles as well as his leg muscles and body weight in operating the bicycle. This provides a much greater source of energy for operating the bicycle than the mere weight of the individual.

This device, which can be made up largely of inexpensive pressings and the like, has great versatility and constitutes a substantial improvement over conventional cycles.

This invention is not to be limited by the embodiments shown in the drawings and described in the description which are given by way of example and not of limitation, but only in accordance with the scope of the appended claims.

I claim:

1. A cycle having a nominal forward direction comprising: a principal frame; a main wheel journal and a crank journal parallel to the main wheel journal, both carried by said principal frame; a main wheel having a driving axle, said driving axle being journaled in the main wheel journal; a crank journaled to the crank journal, the crank journal being positioned forwardly of the front wheel; a steering post projecting from said principal frame; drive means interconnecting said crank and driving axle for rotating the main wheel in response to rotation of the crank; a trailing frame; a steering post journal carried by said trailing frame in which the steering post is journaled; a seat carried by said trailing frame, said crank journal and said seat being on opposite sides of an upright steering axis that passes through the main wheel journal, the seat being located rearwardly of the main wheel journal and the crank journal; and a trailing wheel supporting said trailing frame rearwardly of the main wheel.

2. A cycle according to claim 1 in which the principal frame is sector-shaped, with an apex at the main wheel journal.

3. A cycle according to claim 1 in which the principal frame is unitary.

4. A cycle according to claim 1 in which the principal frame is a U-sectioned pressing.

5. A cycle according to claim 1 in which the trailing wheel is mounted to the trailing frame by a spring joint.

6. A cycle according to claim 5 in which the principal frame is sector-shaped, with an apex at the main wheel journal.

7. A cycle according to claim 1 in which a stabilizer wheel projects forwardly of the crank journal, the lowest point of said stabilizer wheel being above the lowest point of the main wheel when the trailing wheel and the main wheel are in contact with level ground.

8. A cycle according to claim 1 in which a pair of said trailing wheels is provided with coaxial centers.

9. A cycle according to claim 1 in which a pair of handle bars is attached to the steering post, the handle bars standing above a line extending between the seat and the crank journal.

10. A cycle according to claim 1 in which a telescopic joint is interposed between the trailing frame and the trailing wheel, whereby the wheel base may adjustably be varied.

11. A cycle according to claim 1 in which the trailing frame is detachably secured to the steering post journal.

12. In a cycle having a nominal forward direction: a principal frame adapted to be stabilized by a trailing frame which carries a trailing wheel; a main wheel journal and a crank journal, both carried by said principal frame, said main wheel journal and crank journal being parallel; a main wheel having a driving axle, said driving axle being journaled in the main wheel journal; a crank journaled to the crank journal, the crank journal being positioned forwardly of the main wheel; a steering post projecting from said principal frame; drive means interconnecting said crank and driving axle for turning the main wheel in response to turning of the crank, said steering post being adapted to be journaled to the trailing frame.

References Cited by the Examiner

UNITED STATES PATENTS

| | | | |
|---|---|---|---|
| 446,175 | 2/1891 | Scantlebury | 280—275 X |
| 561,798 | 6/1896 | Lawson | 280—239 X |
| 1,846,224 | 2/1932 | Roberds | 280—261 |
| 2,068,125 | 1/1937 | Kraeft | 280—274 |
| 2,158,618 | 5/1939 | Dobrowolski | 280—282 X |
| 2,467,941 | 4/1949 | Mackowiak | 280—282 X |
| 2,565,848 | 8/1951 | Howard | 280—287 X |
| 2,948,551 | 8/1960 | Du Vall | 280—287 X |

FOREIGN PATENTS 69,706  7/1893  Germany.

KENNETH H. BETTS, *Primary Examiner.*